United States Patent [19]

Satoh et al.

[11] Patent Number: 5,386,506
[45] Date of Patent: Jan. 31, 1995

[54] PLOTTING AND EDITING APPARATUS

[75] Inventors: Kenji Satoh; Miki Tsuchiya; Giichiro Akimori; Yoshitaka Tezuka, all of Saitama, Japan

[73] Assignee: Honda Giken Kogyo Kabushiki Kaisha, Tokyo, Japan

[21] Appl. No.: 983,729

[22] Filed: Dec. 1, 1992

[30] Foreign Application Priority Data

Dec. 2, 1991 [JP] Japan ................... 3-318216

[51] Int. Cl.$^6$ ............................................. G06F 15/00
[52] U.S. Cl. ...................................................... 395/160
[58] Field of Search ............... 395/160, 124, 119, 120, 395/121, 122, 164, 165, 166; 345/189, 190, 201, 202; 364/401, 402, 403

[56] References Cited

U.S. PATENT DOCUMENTS 5,182,055  1/1993  Allison et al. ................... 264/22
5,214,751  5/1993  Robat ............................. 395/129

Primary Examiner—Phu K. Nguyen

[57] ABSTRACT

An image data file contains a plurality of layers of representative shapes of a target object to be plotted. Under control of a CPU, a CRT display unit displays the representative shapes retrieved from each layer. When one of the shapes is selected using a keyboard or a mouse, the representative shapes in the next lower layer relative to the selected shape is displayed. Ultimately, the shape of the target object is displayed.

50 Claims, 6 Drawing Sheets

PLOTTING AND EDITING APPARATUS

BACKGROUND OF THE INVENTION

1. Field of the Invention

The present invention relates to a plotting and editing apparatus for use in plotting and editing applications. More specifically, the present invention is directed to a plotting and editing system for computer aided design systems.

2. Description of the Background Art

Various computer aided design tools and systems have been developed and utilized. These apparatuses, generically called CAD, support the plotting and editing of drawings. CADs permit easy plotting of drawings and are capable of storing the result of the plot and retrieving the stored contents of the plots for subsequent correction or editing.

One disadvantage of the conventional CAD apparatus is that when part of a drawing is to be corrected, that part must be plotted separately. This takes time and lowers the efficiency of plotting.

Another disadvantage is that when part of a previously plotted drawing needs to be corrected to create a new drawing with the conventional CAD apparatus, it takes considerable time and effort to search for the applicable drawing among the numerous drawings stored.

A further disadvantage with the conventional CAD apparatus is that it only supports plotting and the related operations and fails to address the applicability of the target object to be plotted. Illustratively, the conventional CAD apparatus is incapable of checking to determine if the plotted object is conducive to mass production. That is, if the plotted target object was unchecked and was actually produced, the process could turn out to be too costly, or the availability of necessary parts could be impracticably low.

SUMMARY OF THE INVENTION

It is therefore an object of the present invention to provide a plotting and editing apparatus having an ability to carry out a search very easily for any of previously created drawings, an ability to perform easy modification of a part of any previously created drawing, and an ability to verify plotted results for applicability to mass production.

The present invention, according to a first aspect thereof, provides a plotting and editing apparatus which comprises a representative shape storing device for classifying the shape of the target object to be plotted into classes constituting a classification system of a plurality of layers. The layers categorize each of the classes into progressively lower classes, thereby storing the representative shape of each of the classes making up the classification system. The present invention also includes a target object shape storing device for storing the shape of the target object belonging to each of the classes in the lowest layer of the classification system and a display for displaying shapes retrieved from the representative shape storing device and from the target object shape storing device. A selecting device selects any of the shapes displayed on the display, and a shape retrieving device retrieves from the representative shape storing device the representative shape corresponding to each of the classes in the highest layer of the classification system, retrieves from the representative shape storing device, when the selecting device selects any representative shape, the representative shape corresponding to each of the classes in the next lowest layer relative to the selected shape, and retrieves from the representative shape storing device, when the lowest layer of the classification system is reached, the shape of the target object corresponding to the selected class. Lastly, the present invention includes an editor for editing the shapes displayed on the display.

According to a second aspect of the present invention, a plotting and editing apparatus comprises a representative shape storing device for classifying the shape of the target object to be plotted into classes constituting a classification system of a plurality of layers, the layers categorizing each of the classes into progressively lower classes, thereby storing the representative shape of each of the classes making up the classification system, and a target object shape storing device for storing the shapes of the target objects belonging to each of the classes in the lowest layer of the classification system. The present invention also includes a unit shape storing device for storing a plurality of shapes of a unit constituting part of the target object and a display for displaying shapes retrieved from the representative shape storing device, from the target object shape storing device and from the unit shape storing device. A selecting device selects any of the shapes displayed on the display and a shape retrieving device retrieves from the representative shape storing device the representative shape corresponding to each of the classes in the highest layer of the classification system, retrieves from the representative shape storing device, when the selecting device selects any representative shape, the representative shape corresponding to each of the classes in the next lower layer relative to the selected shape, and retrieves from the representative shape storing device, when the lowest layer of the classification system is reached, the shape of the target object corresponding to the selected class. A unit designating device designates any of the units of the target object displayed on the display, and a unit shape substituting device retrieves from the unit shape storing device the unit designated by the unit designating device in order to substitute the retrieved unit for the corresponding part of the target object.

In a preferred structure according to the present invention, the plotting and editing apparatus has the classes at least in the highest layer categorized in terms of production lines for a factory.

In a further preferred structure according to the present invention, the plotting and editing apparatus comprises a target object applicability data storing device for storing data about the applicability of the target object belonging to each of the classes in the lowest layer and a target object applicability data display controlling device for retrieving from the target object applicability data storing device the data about a given shape of the target object when the shape is retrieved from the target object shape storing device, the retrieved data being thereupon displayed.

In yet a further preferred structure according to the present invention, the plotting and editing apparatus comprises a part applicability data storing device for storing data about the applicability of each of the parts constituting the unit; a part selecting device for selecting any of the parts constituting the unit when the shape of the unit is being displayed on the display; and a part applicability data display controlling device for retrieving from the part applicability data storing device the data about the part selected by the part selecting device and the data about the part substituting for the selected part, the retrieved data being thereupon displayed.

In another preferred structure according to the present invention, the plotting and editing apparatus comprises an applicability judging device for referencing, if any one of the unit and the part constituting the unit is substituted, any one of the target object applicability data storing device and the part applicability data storing device in order to judge the applicability of the part constituting the contents of a plot, whereby an applicability identification symbol is displayed with respect to the plot if all parts are judged to be applicable.

In yet another preferred structure according to the present invention, the plotting and editing apparatus requires that the condition for satisfying the test of applicability be the feasibility of mass production.

The present invention when embodied sorts out in multiple layers the representative shapes of the target object to be plotted. The selecting device and the shape retrieving device allow the embodiment to search the layers from the top down for the sought-after object. This makes it possible to search the storage for a target drawing in a more efficient manner with fewer steps.

The present invention, when otherwise embodied, stores beforehand the unit of the drawing which is to be substituted. The unit shape substituting device of the embodiment substitutes the unit retrieved from storage for the corresponding part of the target object.

The present invention, when alternatively embodied, displays information about the applicability of each of parts and units with respect to a certain condition. When further modified, this embodiment checks to see if such parts and units are suitable for mass production.

BRIEF DESCRIPTION OF DRAWINGS

Other objects and advantages of the present invention will become more apparent from the detailed description of the preferred embodiments with reference to the accompanied drawings, which are given by way of illustration only and thus are not limitative of the present invention, and wherein.

DETAILED DESCRIPTION OF THE DRAWINGS

Figure 1:
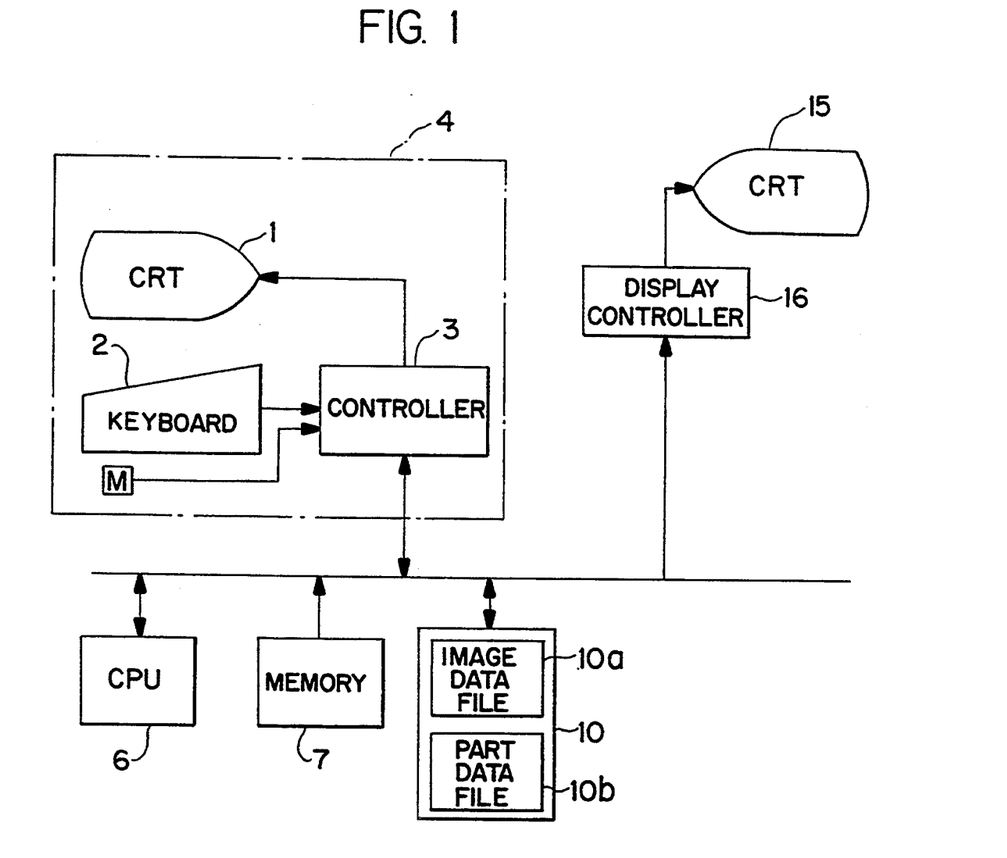
FIG. 1 is a block diagram of a plotting and editing apparatus of the present invention.

FIG. 1 is a block diagram of a plotting and editing apparatus embodying the present invention. The embodiment is used illustratively to plot a design drawing of a rearview mirror for use with motorcycles.

In FIG. 1, a console 4 comprises a cathode ray tube (CRT) display unit 1, a keyboard 2 and a mouse M and is used by an operator for plotting and editing. A controller 3 in the console 4 controls the CRT display unit 1 and scans the keys of the keyboard 2. The keyboard 2 allows various commands and values to be inputted. The mouse M is used to enter position data pointing to the cursor position. The inputted commands and data are fed to a CPU 6 via the controller 3. Operating under the program in a program memory 7, the CPU 6 controls the components of the embodiment. The CPU 6 transfers various steps of image data to the controller 3. In turn, the controller 3 causes the CRT display unit 1 to display the transferred image data.

A file memory 10 has an image data file 10a and a part data file 10b. The image data file 10a contains the sets of image data to be retrieved next.

There are four kinds of sets of image data used by the embodiment: primary class image data, secondary class image data, product image data and unit image data.

(1) Primary class image data

Figure 5:
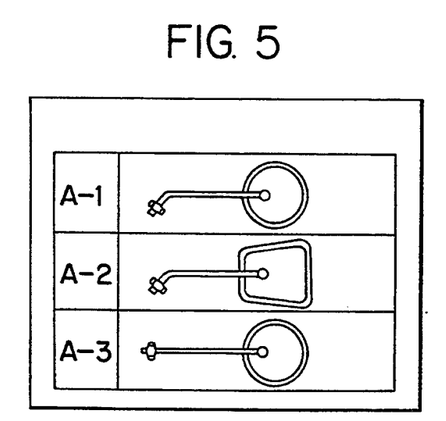
FIG. 5 is a view of another typical screen displayed on the CRT display unit.

This kind of image data refers to the characteristic shape of any of the primary class images each representing the target object. As shown in FIG. 5, the primary class image data for this embodiment has three shape types, each type corresponding to one production line of the rearview mirror factory. At the factory, the parts whose shapes are identified as A-1, A-2, and A-3 are manufactured by three separate production lines.

(2) Secondary class image data

Figure 6:
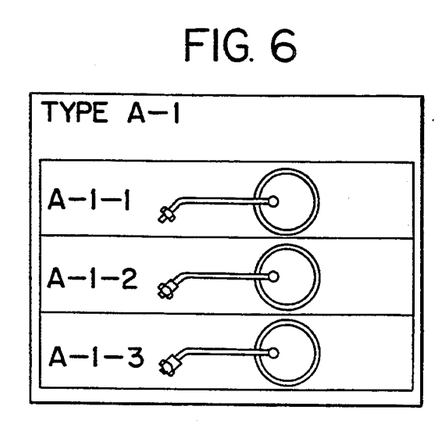
FIG. 6 is a view of another typical screen displayed on the CRT display unit.

This kind of image data refers to the characteristic shape of any of the secondary class images obtained by further classification of each primary class shape. For example, as depicted in FIG. 6, three secondary class images A-1-1, A-1-2, and A-1-3 are established under the primary class shape A-1.

(3) Product image data

Figure 8:
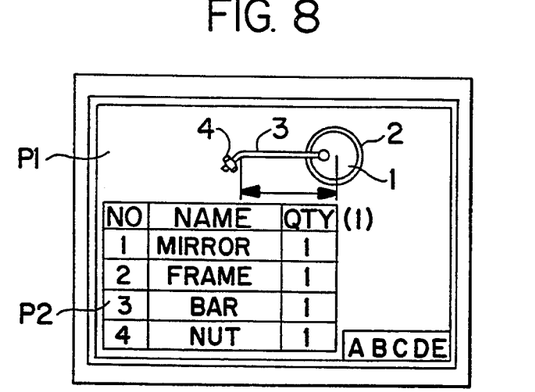
FIG. 8 is a view of another typical screen displayed on the CRT display unit.

This kind of image data substantially approximates the target part to be plotted. A product image comes under one of the secondary classes. An example of the product image is illustrated in FIG. 8.

(4) Unit image data

This kind of image data refers to the shape of a unit constituting part of a product image. A plurality of unit image data are stored for the same part. Each unit is made of at least two parts.

The above four kinds of image data are stored in the image data file 10a. The part data file 10b accommodates part lists which in turn contain data including data for indicating whether or not the product or part in question is available as a standard model. The standard model refers to any currently mass-produced products or parts that are available at low manufacturing cost. That is, those parts or products other than standard models, have a much higher cost when procured.

A CRT display unit 15 shown in FIG. 1 is set up at the factory. The unit 15 provides indications under control of a display controller 16 connected thereto. The display controller 16 causes the CRT display unit 15 to display the image data transferred from the CPU 6.

OPERATIONS OF THE PRESENT INVENTION

The operations of the present invention will now be described with reference to the flowcharts of FIGS. 2 and 3.

Figure 4:
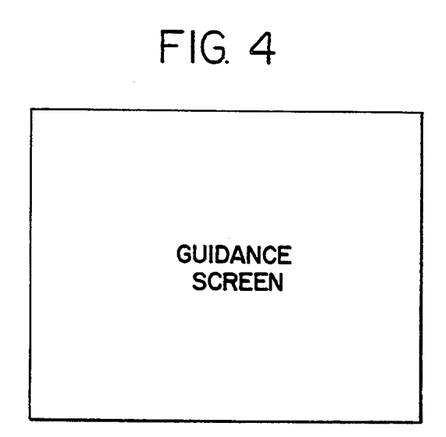
FIG. 4 is a view of a typical screen displayed on a CRT display unit.

The operation starts at step SP1. At step SP2, the CPU 6 causes the CRT display unit 1 to display a guidance screen that explains operating procedures to the operator (see FIG. 4). At step SP3, the CRT display unit 1 displays primary class images. Specifically, the CPU 6 retrieves primary class image data from the image data file 10a and transfers the data to the controller 3. Upon receipt of the primary class image data, the controller 3 displays shapes A-1, A-2, and A-3 as shown in FIG. 5.

The operator then selects a desired shape from the screen of the CRT display unit 1. The selection is accomplished by operation of the keyboard 2 or by use of the mouse M (with clicking operation).

Suppose that the shape A-1 of FIG. 5 is selected. The CPU 6 then goes to step SP4, retrieves from the image data file 10a the secondary class image data that come under the primary class shape A-1, and transfers this data to the controller 3. This causes the CRT display unit 1 to display the secondary class images as shown in FIG. 6. In the example of FIG. 6, three secondary class images A-1-1, A-1-2, and A-1-3 are displayed. If the shape A-1-1 is selected, the CPU 6 goes to step SP5, retrieves from the part data file 10b the part list belonging to the secondary class shape in question, and transfers the part list to the controller 3. As a result of this, the controller 3 displays the screen of FIG. 7.

Figure 7:
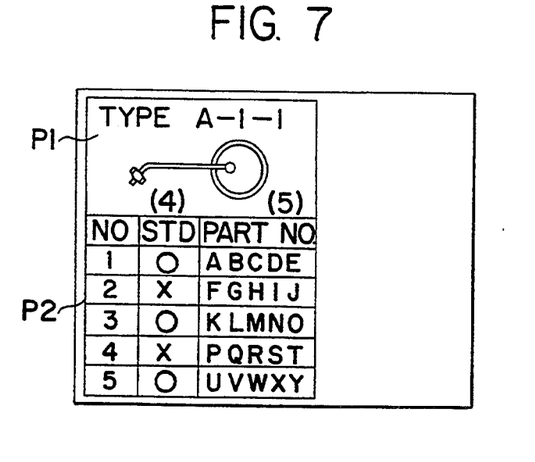
FIG. 7 is a view of another typical screen displayed on the CRT display unit.

The screen of FIG. 7 displays the selected secondary class shape A-1-1 in a field P1, and lists in a field P2 the part numbers of the actual parts belonging to the secondary class shape in question. For a comprehensive display of the part numbers of mass-produced parts, the screen of FIG. 7 is called a mass-produced parts' number list. The "No." column of this list shows the serial numbers of the applicable parts, starting from 1. The "Part No." column lists the part numbers of the parts. The "Standard" column contains either a circle or a cross for each part. A circle means that all subordinate parts constituting that part are standard parts. A cross-prefixed part is a part whose subordinate parts include nonstandard parts. Because standard parts are available at low cost, the operator makes appropriate choices in terms of cost by checking the circle/cross indications. The "No.," "Part No.," and "Standard" columns are displayed according to relevant data in the part data file 10b.

When the operator selects a desired part number in the screen of FIG. 7, the CPU 6 goes to step SP6. In step SP6, the CPU 6 retrieves data about the part having the selected part number from the image data file 10a and from the part data file 10b, and transfers the data to the controller 3. Based on the transferred data, the controller 3 illustratively displays the screen of FIG. 8. The screen of FIG. 8 is a screen displaying when the part number "ABCDE" is selected. The part number appears in the bottom right corner of the screen. The field P1 of the screen shows the shape of the part having the part number "ABCDE." The field P2 indicates information about the subordinate component parts constituting the part in question. Specifically, the "No." column of the field P2 shows the numbers of the component parts, the "Name" column the names of the component parts, and the "Quantity" column the part counts. Illustratively, the "Name" column of FIG. 8 contains such names as "mirror," "frame," "bar," and "nut," i.e. components of the rearview mirror for motorcycles. The part numbers of the component parts given in the "No." column match the numbers shown in the field P1.

Figure 2:
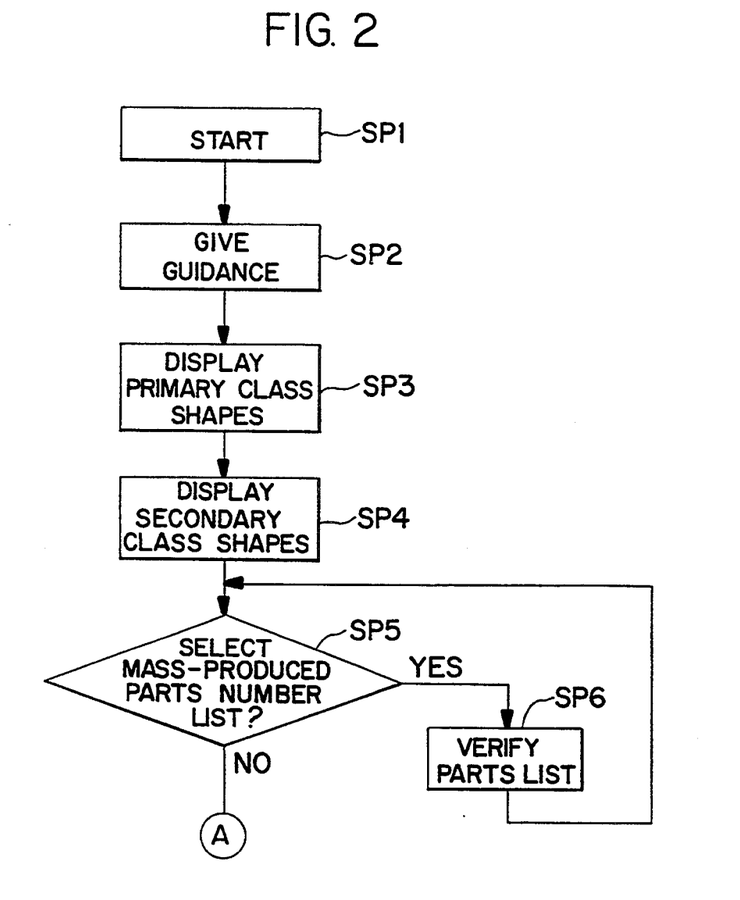
FIG. 2 is a flowchart illustrating the process carried out by the embodiment of FIG. 1.

After the above-described verification of the mass-produced parts' number list, the operator decides either to return to step SP5 of FIG. 2, or to end the processing. If the verified list is used unmodified, the processing is to be terminated. If step SP5 is reached again, the operator decides either to select another mass-produced parts' number list or to modify part of the currently selected list. If the decision to select another mass-produced parts' number list is made, step SP6 is reached again, and the same processing as described above is repeated.

Figure 3:
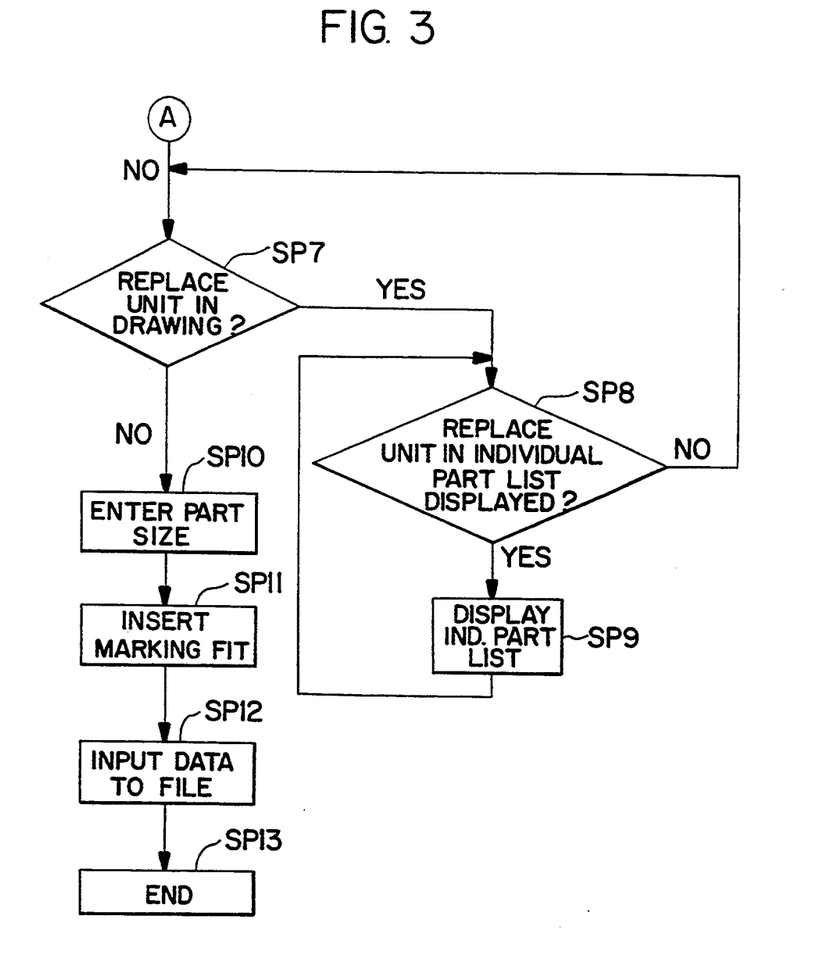
FIG. 3 is another flowchart illustrating the process of the present invention.
Figure 9:
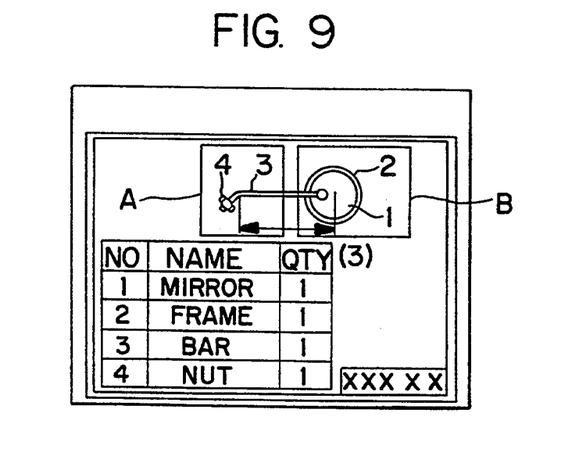
FIG. 9 is a view of another typical screen displayed on the CRT display unit.
Figure 10A:
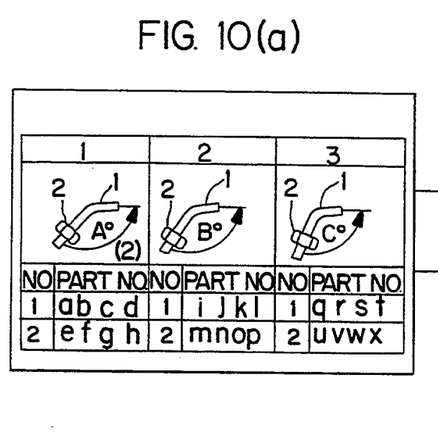
FIGS. 10A and 10B are a set of views of other typical screens displayed on the CRT display unit.

If modification of the currently selected list is chosen, step SP7 of FIG. 3 is reached. Step SP7, as shown in FIG. 9, displays frames A and B onto the mass-produced parts' number list currently selected. The frame A indicates the unit that contains a bar (3) and a nut (4), and the frame B points out the unit that includes a mirror (1) and a frame (2). At this point, the operator selects either the frame A or the frame B. The selection is accomplished illustratively using the mouse M to click the desired frame. When either frame is selected, step SP8 is reached. Step SP8 displays a list of replacement units. FIG. 10(A) is a typical screen displayed when the frame A is selected. As shown, three replacement units are illustratively displayed. Above the frame indicating each unit is a number that identifies the unit. The currently selected unit has its number displayed in reverse video or in color, alerting the operator to the unit now selected.

Figure 10B:
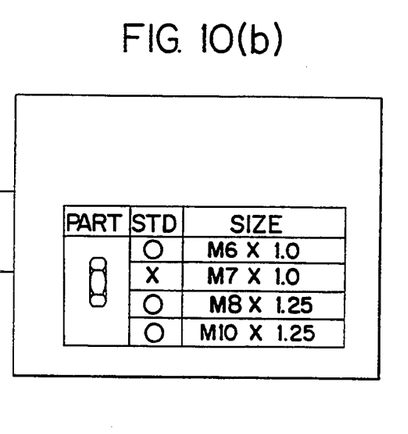

Under the frame indicating each unit is a correspondence table that matches the part numbers of the parts constituting the unit in question with the applicable numbers in the drawings (shown in the "No." column). When one of the parts is selected, step SP9 is reached in which the list of replacement parts associated with the selected part (i.e., individual part list) is displayed. FIG. 10(B) is a typical screen showing the individual part list selected when the nut with the part number "efgh" is selected. The display of FIG. 10(B) comprises an external sketch of the part in question, an indication of whether or not each individual part is standard (prefixed with a circle or a cross), and the screw's size. Given the standard/nonstandard indication, the operator may select a desired part in the screen of FIG. 10(B) in the same manner as with the case of FIG. 7. When the desired part is selected in the screen of FIG. 10(B), step SP8 is reached again in which the screen of FIG. 10(A) again appears.

The replacement unit display of FIG. 10(A) appears in a plurality of screens depending on the number of replacement units. Any of the multiple screens may be selected and displayed using the keyboard 2 or the mouse M to switch screens. The images of replacement units are retrieved as needed from the image data file 10a.

When unit replacement is completed in step SP8, step SP7 is reached again in which the screen of FIG. 9 again appears. If the operator wants to replace a unit in the other frame (A or B), the processes of steps SP8 and SP9 need to be carried out again. If unit replacement is not desired, step SP10 is reached in which part sizes are entered. The part size entry involves the screen of FIG.

Figure 11:
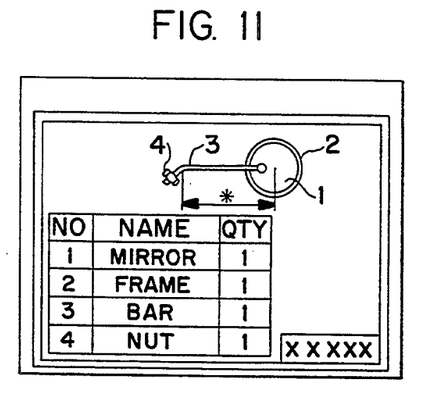
FIG. 11 is a view of another typical screen displayed on the CRT display unit.

11, designating the position into which to enter a required size by use of the mouse M or the cursor keys of the keyboard 2, and operating numeric keys to enter the size into that position. Entering the size completes the drawing. Then step SP11 is reached in which the completed drawing is checked. The check involves verifying each of the parts in the completed drawing using relevant data in the part data file 10b. When all parts within the completed drawing are found to be standard parts, a marking "Fit" is inserted in the bottom right corner of the drawing, as shown in FIG. 12(B).

Figure 12A:
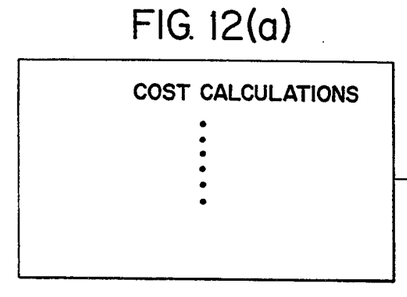
FIGS. 12A and 12B are a set of views of other typical screens displayed on the CRT display unit.
Figure 12B:
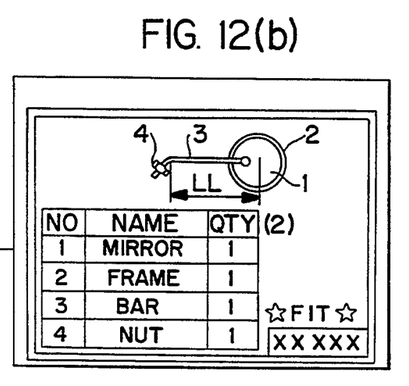

From the screen of FIG. 12(B), it is possible to call up a cost/weight calculation expression screen shown in FIG. 12(A). The operator may enter the unit price, quantity and manufacturing cost of each component part in question into the necessary parts of the cost calculation expression in the screen of FIG. 12(A). The operator may also enter the weight and quantity of each part in question into the weight calculation expression. With the entries into these expressions completed, the cost and weight of the parts in question are calculated. In step SP12, the operator inputs to relevant files the data of the completed drawing of FIG. 12(B) together with the calculated cost and weight of the parts involved. Thereafter, the completed drawing is printed on a printer, not shown. The CPU 6 transfers the image data of the completed drawing to the display controller 16. The controller 16 in turn causes the CRT display unit 15 at the factory to display the image of the completed drawing. Personnel at the factory then proceed to produce the parts by referring to the drawing printed out by printer or displayed on the CRT display unit 15. In the alternative, the data transferred to the factory can by implemented into an automotive system such that robotics can be used to manufacture the device.

The above embodiment is designed to store information about each of the component parts being a mass-produced part or not. Alternatively, the present invention may be modified to store other kinds of information. For example, the present invention may include information about the degree of availability of any desired part as well as optional information about the conduciveness of a given part to mass production.

At the level of rough classification, the present invention divides each part shape into two layers: primary and secondary classes. Alternatively, the part shape may be roughly divided into three or more classes.

As described above and according to the present invention, the representative shape of the target object to be plotted is divided into a plurality of layers. The stored drawing closest to the target object is searched for and obtained by progressing through the layers of stored shapes from the top down. This feature makes the search more effective and efficient.

When a drawing needs to be modified, the affected part of the drawing is prepared in advance and is replaced with a new part. This feature facilitates the process of partial modification.

The classes in the highest layer are sorted and arranged in terms of production lines of the factory. This feature permits search for the drawing that matches the current status of production.

Information concerning the target object, units or parts in the lowest layer as to their applicability to a certain condition is stored and displayed. This feature allows the operator to select what is most appropriate for the purpose at hand.

When all parts used in the completed drawing apply to a certain condition, an applicability identification marking is displayed. This feature provides a checklist for the completed drawing as to the compliance of the parts therein with certain requirements.

Furthermore, the present invention checks the replacement parts and units to see if the part, and units are fit for mass production and, provides an appropriate indication to that effect. This feature ensures the preparation of drawings that take the benefits of mass production into account.

While only certain embodiments of the present invention have been described, it will be apparent to those skilled in the art that various changes and modifications may be made therein without departing from the spirit and scope of the present invention as set forth in the claims below.

What is claimed is:

1. A plotting and editing apparatus comprising:
   representative shape storing means for classifying a shape of a target object to be plotted into classes constituting a classification system of a plurality of layers, said layers categorizing each of the classes into progressively lower classes,
   said representative shape storing means storing a representative shape of each of the classes making up the classification system;
   target object shape storing means for storing the shape of the target object belonging to each of the classes in a lowest layer of the classification system;
   display means for displaying shapes retrieved from said representative shape storing means and from said target object shape storing means;
   selecting means for selecting one of the shapes displayed on said display means;
   shape retrieving means for (a) retrieving from said representative shape storing means the representative shape corresponding to each class in a highest layer of the classification system, (b) retrieving from said representative shape storing means, upon selection via said selecting means of a representative shape displayed on said display means, the representative shape corresponding to each class in a next lower layer relative to the selected shape, and (c) retrieving from said target object shape storing means, when the lowest layer of the classification system is reached, the shape of the target object corresponding to a selected class; and
   editing means for editing the shapes displayed on said display means.

2. The plotting and editing apparatus as claimed in claim 1, wherein the classes in at least the highest layer are categorized in terms of production lines of a factory.

3. The plotting and editing apparatus as claimed in claim 2, further comprising:
   target object applicability data storing means for storing data corresponding to an applicability of the target object; and
   target object applicability data display controlling means for retrieving from said target object applicability data storing means data corresponding to a given shape of the target object when the shape is retrieved from said target object shape storing means, the retrieved data being displayed.

4. The plotting and editing apparatus as claimed in claim 1, further comprising:

target object applicability data storing means for storing data corresponding to an applicability of the target object; and target object applicability data display controlling means for retrieving from said target object applicability data storing means data corresponding to a given shape of the target object when the shape is retrieved from said target object shape storing means, the retrieved data being displayed.

5. A plotting and editing apparatus comprising:

representative shape storing means for classifying a shape of a target object to be plotted into classes constituting a classification system of a plurality of layers, said layers categorizing each of the classes into progressively lower classes, said representative shape storing means storing a representative shape of each of the classes making up the classification system;

target object shape storing means for storing the shape of the target object belonging to each of the classes in a lowest layer of the classification system;

unit shape storing means for storing a plurality of shapes of a unit constituting a part of the target object;

display means for displaying shapes retrieved from said representative shape storing means, from said target object shape storing means, and from said unit shape storing means;

selecting means for selecting one of the shapes displayed on said display means;

shape retrieving means for (a) retrieving from said representative shape storing means the representative shape corresponding to each class in a highest layer of the classification system, (b) retrieving from said representative shape storing means, upon selection via said selecting means of a representative shape displayed on said display means, the representative shape corresponding to each class in a next lower layer relative to the selected shape, and (c) retrieving from said target object shape storing means, when the lowest layer of the classification system is reached, the shape of the target object corresponding to a selected class;

unit designating means for designating one of the units of the target object displayed on said displaying means; and unit shape substituting means for retrieving from said unit shape storing means the unit designated by said unit designating means and for substituting the retrieved unit for a corresponding part of the target object.

6. The plotting and editing apparatus as claimed in claim 5, wherein the classes in at least the highest layer are categorized in terms of production lines of a factory.

7. The plotting and editing apparatus as claimed in claim 6, further comprising:

target object applicability data storing means for storing data corresponding to an applicability of the target object; and target object applicability data display controlling means for retrieving from said target object applicability data storing means data corresponding to a given shape of the target object when the shape is retrieved from said target object shape storing means, the retrieved data being displayed.

8. The plotting and editing apparatus as claimed in claim 7, further comprising:

part applicability data storing means for storing data corresponding to an applicability of each part constituting the unit;

part selecting means for selecting one of the parts constituting the unit when the shape of the unit is being displayed on said display means; and part applicability data display controlling means for retrieving from said part applicability data storing means the data corresponding to the part selected by said part selecting means and data corresponding to the part being substituted for the selected part, the retrieved data being displayed.

9. The plotting and editing apparatus as claimed in claim 8, further comprising:

applicability judging means for referencing, if one of the unit and the part constituting the unit is substituted, said target object applicability data storing means or said part applicability data storing means to judge an applicability of the part constituting the contents of a plot, and for providing display of an applicability identification symbol with respect to the plot if all parts are judged to be applicable.

10. The plotting and editing apparatus as claimed in claim 9, wherein the condition for satisfying the applicability of the part is the feasibility of mass production.

11. The plotting and editing apparatus as claimed in claim 5, further comprising:

target object applicability data storing means for storing data corresponding to an applicability of the target object; and target object applicability data display controlling means for retrieving from said target object applicability data storing means data corresponding to a given shape of the target object when the shape is retrieved from said target object shape storing means, the retrieved data being displayed.

12. The plotting and editing apparatus as claimed in claim 11, further comprising:

part applicability data storing means for storing data corresponding to an applicability of each part constituting the unit;

part selecting means for selecting one of the parts constituting the unit when the shape of the unit is being displayed on said display means; and part applicability data display controlling means for retrieving from said part applicability data storing means the data corresponding to the part selected by said part selecting means and data corresponding to the part being substituted for the selected part, the retrieved data being displayed.

13. The plotting and editing apparatus as claimed in claim 12, further comprising:

applicability judging means for referencing, if one of the unit and the part constituting the unit is substituted, said target object applicability data storing means or said part applicability data storing means to judge an applicability of the part constituting the contents of a plot, and for providing display of an applicability identification symbol with respect to the plot if all parts are judged to be applicable.

14. The plotting and editing apparatus as claimed in claim 13, wherein the condition for satisfying the applicability of the part is the feasibility of mass production.

15. A system for designing mass-produced products using a computer aided design plotting and editing apparatus comprising:

representative shape storing means for classifying a shape of a target object to be plotted into classes constituting a classification system of a plurality of layers, said layers categorizing each of the classes into progressively lower classes, said representative shape storing means storing a representative shape of each of the classes making up the classification system;

target object shape storing means for storing the shape of the target object belonging to each of the classes in a lowest layer of the classification system;

display means for displaying shapes retrieved from said representative shape storing means and from said target object shape storing means;

selecting means for selecting one of the shapes displayed on said display means;

shape retrieving means for (a) retrieving from said representative shape storing means the representative shape corresponding to each class in a highest layer of the classification system, (b) retrieving from said representative shape storing means, upon selection via said selecting means of a representative shape displayed on said display means, the representative shape corresponding to each class in a next lower layer relative to the selected shape, and (c) retrieving from said target object shape storing means, when the lowest layer of the classification system is reached, the shape of the target object corresponding to a selected class;

editing means for editing the shapes displayed on said display means;

transmitting means for transmitting data generated by said editing means to a production area; and screen means, located in the production area, for displaying the transmitted data as a product to be mass-produced.

16. The system as claimed in claim 15, further comprising:

production means, located in the production area, for assembling the product to be mass-produced according to the transmitted data.

17. The system as claimed in claim 15, wherein the classes in at least the highest layer are categorized in terms of production lines of a factory.

18. The system as claimed in claim 15, further comprising:

target object applicability data storing means for storing data corresponding to an applicability of the target object; and target object applicability data display controlling means for retrieving from said target object applicability data storing means data corresponding to a given shape of the target object when the shape is retrieved from said target object shape storing means, the retrieved data being displayed on said display means.

19. The system as claimed in claim 18, wherein the condition for satisfying the applicability of the target object is the feasibility of mass production.

20. A system for designing mass-produced products using a computer aided design plotting and editing apparatus comprising:

representative shape storing means for classifying a shape of a target object to be plotted into classes constituting a classification system of a plurality of layers, said layers categorizing each of the classes into progressively lower classes, said representative shape storing means storing a representative shape of each of the classes making up the classification system;

target object shape storing means for storing the shape of the target object belonging to each of the classes in a lowest layer of the classification system;

unit shape storing means for storing a plurality of shapes of a unit constituting a part of the target object;

display means for displaying shapes retrieved from said representative shape storing means, from said target object shape storing means, and from said unit shape storing means;

selecting means for selecting one of the shapes displayed on said display means;

shape retrieving means for (a) retrieving from said representative shape storing means the representative shape corresponding to each class in a highest layer of the classification system (b) retrieving from said representative shape storing means, upon selection via said selecting means of a representative shape displayed on said display means, the representative shape corresponding to each class in a next lower layer relative to the selected shape, and (c) retrieving from said target object shape storing means, when the lowest layer of the classification system is reached, the shape of the target object corresponding to a selected class;

unit designating means for designating one of the units of the target object displayed on said displaying means;

unit shape substituting means for retrieving from said unit shape storing means the unit designated by said unit designating means and for substituting the retrieved unit for a corresponding part of the target object;

transmitting means for transmitting data generated by said unit shape substituting means to a production area; and screen means, located in the production area, for displaying the transmitted data as a product to be mass-produced.

21. The system as claimed in claim 20, further comprising:

production means, located in the production area, for assembling the product to be mass-produced according to the transmitted data.

22. The system as claimed in claim 20, wherein the classes in at least the highest layer are categorized in terms of production lines of a factory.

23. The system as claimed in claim 20, further comcomprising:

target object applicability data storing means for storing data corresponding to an applicability of the target object; and target object applicability data display controlling means for retrieving from said target object applicability data storing means data corresponding to a given shape of the target object when the shape is retrieved from said target object shape storing means, the retrieved data being displayed on said display means.

24. The system as claimed in claim 23, further comprising:

part applicability data storing means for storing data corresponding to an applicability of each part constituting the unit;

part selecting means for selecting one of the parts constituting the unit when the shape of the unit is being displayed on said display means; and part applicability data display controlling means for retrieving from said part applicability data storing means the data corresponding to the part selected by said part selecting means and data corresponding to the part being substituted for the selected part, the retrieved data being displayed on said display means.

25. The system as claimed in claim 24, further comprising:

applicability judging means for referencing, if one of the unit and the part constituting the unit is substituted, said target object applicability data storing means or said part applicability data storing means to judge an applicability of the part constituting the contents of a plot, and for providing display of an applicability identification symbol with respect to the plot if all parts are judged to be applicable.

26. The system as claimed in claim 25, wherein the condition for satisfying the applicability of the part is the feasibility of mass production.

27. A method for plotting and editing a product developed by a computer aided design apparatus comprising the steps of:

(a) classifying a shape of a target object to be plotted into classes within a first memory, the classes constituting a classification system of a plurality of layers, the layers categorizing each of the classes into progressively lower classes;

(b) storing a representative shape of each of the classes making up the classification system in the first memory;

(c) storing in a target memory the shape of the target object belonging to each of the classes in a lowest layer of the classification system;

(d) displaying shapes retrieved from the first memory and from the target memory;

(e) selecting one of the displayed shapes;

(f) retrieving from the first memory the representative shape corresponding to each class in a highest layer of the classification system;

(g) retrieving from the first memory, when a representative shape is selected in said step (e), the representative shape corresponding to each class in a next lower layer relative to the selected shape;

(h) retrieving from the target memory, when the lowest layer of the classification system is reached, the shape of the target object corresponding to a selected class; and (i) editing the displayed shapes.

28. The method as claimed in claim 27, wherein the classes in at least the highest layer are categorized in terms of production lines of a factory.

29. The method as claimed in claim 27, further comprising the steps of:

(j) storing data in a second memory corresponding to an applicability of the target object; and (k) retrieving from the second memory data corresponding to a given shape of the target object when the shape is retrieved from the target memory, the retrieved data being displayed.

30. The method as claimed in claim 29, wherein the condition for satisfying the applicability of the target object is the feasibility of mass production.

31. A method for plotting and editing a product developed by a computer aided design apparatus comprising the steps of:

(a) classifying a shape of a target object to be plotted into classes within a first memory, the classes constituting a classification system of a plurality of layers, the layers categorizing each of the classes into progressively lower classes;

(b) storing a representative shape of each of the classes making up the classification system in the first memory;

(c) storing in a target memory the shape of the target object belonging to each of the classes in a lowest layer of the classification system;

(d) storing a plurality of shapes of a unit constituting a part of the target object in a unit memory;

(e) displaying shapes retrieved from the first memory, the target memory, and the unit memory;

(f) selecting one of the displayed shapes;

(g) retrieving from the first memory the representative shape corresponding to each class in a highest layer of the classification system;

(h) retrieving from the first memory, when a representative shape is selected in said step (f), the representative shape corresponding to each class in a next lower layer relative to the selected shape;

(i) retrieving from the target memory, when the lowest layer of the classification system is reached, the shape of the target object corresponding to a selected class;

(j) designating one of the units of the displayed target object;

(k) retrieving from the unit memory the unit designated in said step (j); and (l) substituting the retrieved unit for a corresponding part of the target object.

32. The method as claimed in claim 31, wherein the classes in at least the highest layer are categorized in terms of production lines of a factory.

33. The method as claimed in claim 31, further comprising the steps of:

(m) storing data in a second memory corresponding to an applicability of the target object; and (n) retrieving from the second memory data corresponding to a given shape of the target object when the shape is retrieved from the target memory, the retrieved data being displayed.

34. The method as claimed in claim 33, wherein the condition for satisfying the applicability of the target object is the feasibility of mass production.

35. The method as claimed in claim 33, further comprising the steps of:

(o) storing data in a part memory corresponding to an applicability of each part constituting the unit;

(p) selecting one of the parts constituting the unit when the shape of the unit is being displayed; and (q) retrieving from the part memory the data corresponding to the part selected in said step (p) and data corresponding to the part being substituted for in said step (j), the retrieved data being displayed.

36. The method as claimed in claim 35, further comprising the steps of:

(r) referencing, if one of the unit and the part constituting the unit is substituted, the second memory or the part memory to judge an applicability of the part constituting the contents of a plot; and (s) providing an applicability identification symbol to be displayed with respect to the plot if all parts are judged to be applicable.

37. The method as claimed in claim 36, wherein the condition for satisfying the applicability of the part is the feasibility of mass production.

38. A method for designing mass-produced products using a computer aided design plotting and editing apparatus comprising the steps of:
- (a) classifying a shape of a target object to be plotted into classes within a first memory, the classes constituting a classification system of a plurality of layers, the layers categorizing each of the classes into progressively lower classes;
- (b) storing a representative shape of each of the classes making up the classification system in the first memory;
- (c) storing in a target memory the shape of the target object belonging to each of the classes in a lowest layer of the classification system;
- (d) displaying shapes retrieved from the first memory and from the target memory;
- (e) selecting one of the displayed shapes;
- (f) retrieving from the first memory the representative shape corresponding to each class in a highest layer of the classification system;
- (g) retrieving from the first memory, when a representative shape is selected in said step (e), the representative shape corresponding to each class in a next lower layer relative to the selected shape;
- (h) retrieving from the target memory, when the lowest layer of the classification system is reached, the shape of the target object corresponding to the selected class;
- (i) editing the displayed shapes;
- (j) transmitting data generated in said step (i) to a production area; and
- (k) displaying in the production area, the transmitted data as a product to be mass-produced.

39. The method as claimed in claim 38, further comprising the step of:
- (l) assembling in the production area the product to be mass-produced according to the transmitted data.

40. The method as claimed in claim 38, wherein the classes in at least the highest layer are categorized in terms of production lines of a factory.

41. The method as claimed in claim 38, further comprising the steps of:
- (l) storing data in a second memory corresponding to an applicability of the target object; and
- (m) retrieving from the second memory data corresponding to a given shape of the target object when the shape is retrieved from the target memory, the retrieved data being displayed.

42. The method as claimed in claim 41, wherein the condition for satisfying the applicability of the target object is the feasibility of mass production.

43. A method for designing mass-produced products using a computer aided design plotting and editing apparatus comprising the steps of:
- (a) classifying a shape of a target object to be plotted into classes within a first memory, the classes constituting a classification system of a plurality of layers, the layers categorizing each of the classes into progressively lower classes;
- (b) storing a representative shape of each of the classes making up the classification system in the first memory;
- (c) storing in a target memory the shape of the target object belonging to each of the classes in a lowest layer of the classification system;
- (d) storing a plurality of shapes of a unit constituting a part of the target object in a unit memory;
- (e) displaying shapes retrieved from the first memory, the target memory, and the unit memory;
- (f) selecting one of the displayed shapes;
- (g) retrieving from the first memory the representative shape corresponding to each class in a highest layer of the classification system;
- (h) retrieving from the first memory, when a representative shape is selected in said step (f), the representative shape corresponding to each class in a next lower layer relative to the selected shape;
- (i) retrieving from the target memory, when the lowest layer of the classification system is reached, the shape of the target object corresponding to a selected class;
- (j) designating one of the units of the displayed target object;
- (k) retrieving from the unit memory the unit designated in said step (j);
- (l) substituting the retrieved unit for a corresponding part of the target object;
- (m) transmitting data generated in said step (l) to a production area; and
- (n) displaying in the production area the transmitted data as a product to be mass-produced.

44. The method as claimed in claim 43, further comprising the step of:
- (o) assembling in the production area the product to be mass-produced according to the transmitted data.

45. The method as claimed in claim 43, wherein the classes in at least the highest layer are categorized in terms of production lines of a factory.

46. The method as claimed in claim 43, further comprising the steps of:
- (o) storing data in a second memory corresponding to an applicability of the target object; and
- (p) retrieving from the second memory data corresponding to a given shape of the target object when the shape is retrieved from the target memory, the retrieved data being displayed.

47. The method as claimed in claim 46, wherein the condition for satisfying the applicability of the target object is the feasibility of mass production.

48. The method as claimed in claim 46, further comprising the steps of:
- (q) storing data in a part memory corresponding to an applicability of each part constituting the unit;
- (r) selecting one of the parts constituting the unit when the shape of the unit is being displayed; and
- (s) retrieving from the part memory the data corresponding to the part selected in said step (r) and data corresponding to the part being substituted for in said step (l), the retrieved data being displayed.

49. The method as claimed in claim 48, further comprising the steps of:
- (t) referencing, if one of the unit and the part constituting the unit is substituted, the second memory or the part memory to judge an applicability of the part constituting the contents of a plot; and
- (u) providing an applicability identification symbol to be displayed with respect to the plot if all parts are judged to be applicable.

50. The method as claimed in claim 49, wherein the condition for satisfying the applicability of the part is the feasibility of mass production.

* * * * *